United States Patent
Langeder et al.

(10) Patent No.: US 8,627,833 B2
(45) Date of Patent: Jan. 14, 2014

(54) APPARATUS AND METHOD FOR CLEANING WELDING TORCHES

(75) Inventors: Harald Langeder, Pettenbach (AT); Erich Eglseder, Kirshdorf/Krems (AT); Wilhelm Oeller, Vienna (AT); Manfred Bruckner, Kremsmuenster (AT)

(73) Assignee: Fronius International GmbH, Pettenbach (AT)

( * ) Notice: Subject to any disclaimer, the term of this patent is extended or adjusted under 35 U.S.C. 154(b) by 375 days.

(21) Appl. No.: 12/736,528

(22) PCT Filed: May 20, 2009

(86) PCT No.: PCT/AT2009/000208
§ 371 (c)(1),
(2), (4) Date: Oct. 15, 2010

(87) PCT Pub. No.: WO2009/155623
PCT Pub. Date: Dec. 30, 2009

(65) Prior Publication Data
US 2011/0030723 A1    Feb. 10, 2011

(30) Foreign Application Priority Data
Jun. 24, 2008  (AT) .............................. A 1008/2008

(51) Int. Cl.
*B08B 3/00*    (2006.01)
(52) U.S. Cl.
USPC .......................................... 134/105; 373/138
(58) Field of Classification Search
None
See application file for complete search history.

(56) References Cited

U.S. PATENT DOCUMENTS

| | | | |
|---|---|---|---|
| 3,567,026 A | 3/1971 | Kolm | |
| 3,703,958 A | 11/1972 | Kolm | |
| 3,878,311 A * | 4/1975 | Andersson et al. | 373/159 |
| 4,838,287 A | 6/1989 | Matsui et al. | |
| 5,106,491 A * | 4/1992 | Schulze et al. | 210/87 |
| 5,847,491 A * | 12/1998 | Taihaku et al. | 310/355 |

(Continued)

FOREIGN PATENT DOCUMENTS

| | | |
|---|---|---|
| CN | 1691997 | 11/2005 |
| EP | 1 558 420 | 8/2005 |

(Continued)

OTHER PUBLICATIONS

Japanese Office Action dated Oct. 18, 2012 in Japanese Application No. 2011-515011 with English translation.

(Continued)

*Primary Examiner* — Jason Ko
(74) *Attorney, Agent, or Firm* — Collard & Roe, P.C.

(57) ABSTRACT

The invention relates to a cleaning apparatus (1) for cleaning welding torches (5), comprising at least two coils (4, 11) and an opening (3) in order to introduce the welding torch (5) for the electromagnetic cleaning thereof, a supply device (7) connected to the coils (4, 11), and optionally an apparatus for applying a cleaning fluid to the tip of the welding torch (5), wherein preferably all components are disposed in a common housing (2) and regulated by a controller (8), and to a corresponding method for cleaning welding torches (5). In order to increase the cleaning quality and the cleaning range, according to the invention the coils (4, 11) can be supplied independently of each other with electrical energy by the supply device (7) for the purpose of cleaning the welding torch (5), and a cooling apparatus (14) is provided for cooling the coils (4, 11).

12 Claims, 2 Drawing Sheets

(56) References Cited

U.S. PATENT DOCUMENTS

| | | | |
|---|---|---|---|
| 6,335,513 B1 | 1/2002 | Baum | |
| 7,116,204 B2 * | 10/2006 | Fushimi | 336/208 |
| 2006/0065284 A1 | 3/2006 | Langeder et al. | |
| 2007/0256714 A1 | 11/2007 | Binder et al. | |
| 2009/0199882 A1 | 8/2009 | Langeder et al. | |

FOREIGN PATENT DOCUMENTS

| | | | |
|---|---|---|---|
| GB | 1 286 488 | | 8/1972 |
| GB | 2 297 817 | | 8/1996 |
| JP | 50-001939 | | 1/1975 |
| JP | 62-102824 | | 5/1987 |
| JP | 62-151279 | | 7/1987 |
| JP | 62-192273 | | 8/1987 |
| JP | 01-078679 | | 3/1989 |
| JP | 64-078679 | | 3/1989 |
| JP | 06-224035 | | 8/1994 |
| JP | 2555631 | * | 11/1996 |
| JP | 2006-504532 | | 2/2006 |
| WO | WO 01/56730 | | 8/2001 |
| WO | WO 01/64383 | | 9/2001 |
| WO | WO 2004/039528 | | 5/2004 |
| WO | WO 2005/097362 | | 10/2005 |

OTHER PUBLICATIONS

International Search Report.
Austrian Office Action and Search Report dated Jan. 13, 2009 with English translation of the relevant parts.
Chinese Office Action in Chinese Patent Application No. 200980116912.2, Sep. 2012.

* cited by examiner

US 8,627,833 B2

APPARATUS AND METHOD FOR CLEANING WELDING TORCHES

CROSS REFERENCE TO RELATED APPLICATIONS

This application is the National Stage of PCT/AT2009/000208 filed on May 20, 2009, which claims priority under 35 U.S.C. §119 of Austrian Application No. A 1008/2008 filed on Jun. 24, 2008, the disclosure of which is incorporated by reference. The international application under PCT article 21(2) was not published in English.

The invention relates to a cleaning apparatus for cleaning welding torches, including at least two coils and an opening for introducing the welding torch for the electromagnetic cleaning thereof, a supply device connected with the coils, and optionally a device for applying a cleaning fluid to the tip, in particular a gas nozzle, of the welding torch, wherein preferably all components are arranged in a common housing and controlled by a control device.

The invention further relates to a method for cleaning a welding torch, in which a tip, in particular a gas nozzle, of the welding torch is exposed to an electromagnetic field generated by at least two coils for the contactless removal of contaminants, wherein a cleaning fluid or a wetting fluid is optionally applied to the tip of the welding torch prior to cleaning.

During a welding procedure, welding torches are dirtied by molten metal spatters. Metal spatters will also deposit, and solidify, within the gas nozzle of a welding torch. As a result, the protective-gas flow through the gas nozzle will be disturbed by the deposited metal spatters such that atmospheric air will also be able to reach the welding site, thus possibly negatively affecting the welding process and deteriorating the quality of the weld. A perfectly operating and largely clean welding torch is, therefore, important for the production of a high-quality weld.

Welding torches are, therefore, regularly cleaned from adhering metal spatters. During the cleaning period, the welding torch is, however, not available for welding operations. It is therefore, sought to perform such cleaning procedures as rapidly as possible. There are mechanical methods for cleaning welding torches, by which deposits are removed from the tip, in particular the gas nozzle, of the welding torch by the aid of brushes, blades or the like. Using such mechanical cleaning methods, it is, however, only feasible to a limited extent to clean the interior of the gas nozzle of the welding torch as perfectly as possible. Moreover, the components of a welding torch will be damaged by mechanical actions so that their service lives will be reduced accordingly. Damage to the surfaces of the welding torch components will even promote the adherence of weld spatters, which will result in an even more rapid obstruction of the gas nozzle and call for more frequent cleaning of the welding torch and/or exchanging of the gas nozzle. The welding torch should, moreover, be cooled prior to the cleaning procedure, which would again extend the cleaning time.

U.S. Pat. No. 4,838,287 A, for instance, describes a method for con-tactlessly cleaning welding torches by using a coil through which electric current flows. To this end, the tip of the welding torch is introduced into the opening of the coil and a suitable current pulse is applied. The resulting electromagnetic field generates appropriate magnetic forces also acting on the deposits on the welding torch and, hence, removing the same. In doing so, the removal is effected without any mechanical action on the welding torch components, thus sparing the latter and extending their service lives.

To cool the welding torch prior to electromagnetic cleaning, on the one hand, and also facilitate the removal of foreign substances by suitable cleaning agents, on the other hand, the welding torch is usually immersed into a liquid. That liquid may comprise water or mixtures of water with special solvents. For an efficient electromagnetic cleaning, it will be advantageous if the metal spatters on the welding torch are rapidly cooled by immersion into a cleaning liquid. Due to different thermal expansions of the metal spatters and the gas nozzle, which is usually made of copper, such a rapid cooling will, thus cause a reduction of the adherence of metal spatter to the welding torch.

An arrangement for cleaning welding torches, comprising a liquid-filled tub for immersing the welding torch and a coil for electromagnetically cleaning the welding torch is, for instance, described in WO 01/56730 A2. There, a liquid tub and a post containing the coil are arranged immediately beside the workpiece to be welded so as to enable the welding torch, which is, in particular, mounted on a robot arm, to be automatically cleaned even between welding procedures. In doing so, it is, however, disadvantageous that there is, for instance, no place on the post for supply means to the coil such that the latter has to be connected by appropriate lines. Such lines provided between the supply means and the cleaning unit may transmit electromagnetic fields derived from the high current pulses, which may lead to failures of other appliances or control systems.

From EP 1 558 420 B1 a cleaning apparatus for the contactless cleaning of welding torches via a magnetic field is, furthermore known, in which the coil for the magnetic cleaning and a container for the cleaning fluid are arranged in a common housing, with the welding torch being insertable into the coil via an opening provided in the housing. A supply unit is arranged in the housing such that the supply of the coil takes place via lines as short as possible. In that case, the device for applying the cleaning fluid and the coil, along with a waste container disposed below the coil for receiving the electromagnetically removed contaminants are arranged in the housing. That arrangement, moreover, enables the application of the cleaning fluid and the electromagnetic cleaning of the gas nozzle substantially in the same position of the welding torch.

From WO 2005/97362 A, a cleaning apparatus for cleaning welding torches, including a device for the electromagnetic cleaning of the welding torch is known, which comprises a coil having an opening for the introduction of the welding torch for electromagnetic cleaning and a device for the application of cleaning fluid to the tip, in particular the gas nozzle, of the welding torch, which are arranged in a common housing. There, a second device for cleaning the welding torch is additionally arranged in the common housing, which second device uses a cold medium and, in particular, $CO_2$ dry ice. A common control device, a common input/output device and a common supply device or power source are arranged in the common housing for controlling, adjusting and powering the cleaning device.

A device for the electromagnetic cleaning of welding torches of the present type is known from JP 1 078 679 A.

The object of the present invention is to provide an apparatus and a method for cleaning a welding torch, by which the cleaning quality and the cleaning area can be increased.

The object of the invention is achieved in that, for the cleaning of the welding torch, the coils are suppliable with electrical energy by the supply device independently of one another, and that a cooling device is provided for cooling the coils. In this case, it is advantageous that thereby at least two consecutive magnetic fields are produced, which fuse to a common magnetic field. Thus, an electromagnetic field is generated over a prolonged period of time, which extends over an enlarged region due to the use of the at least two coils, thus providing an enlarged cleaning area for the welding torch. With the magnetic cleaning apparatus so far known from the prior art, which have comprised but a single coil, it is necessary to approach two different positions for cleaning because of the short usable area under the action of force. This will, on the one hand, involve increased programming expenditures for the usually employed welding robots and, on the other hand, result in only a partial region of the torch being cleaned at a time. Due to the enlarged usable cleaning area provided by the use of at least two coils, the entire interior of the welding torch can be cleaned using a single cleaning position. Thus, the cleaning efficiency is at least doubled, start-up, adjustment and programming are substantially facilitated, and the chance of malfunctioning is reduced to a minimum.

Due to the cooling device provided for cooling the coils, the heat forming during a cleaning process by the magnetic field can be carried off the coils so as to enable an extended operation of the cleaning apparatus.

A configuration in which the coils are connected with one or several capacitors of the supply device via an interposed switching element is advantageous. The coils can thus be supplied with high energy within a very short time so as to ensure a more rapid build-up of a magnetic field.

In an advantageous manner, the capacitors are directly connected to the output of a short-circuit-resistant transformer. It is thus feasible to provide a simple and costeffective structure for charging the capacitors while, at the same time, realizing a galvanic separation.

The cooling device may be arranged between the coils.

If the cooling device is integrated in at least one of the coils, an even better heat dissipation from, and cooling of, the coils will be achieved so as to prevent heat from accumulating in the interior of the coils.

The cooling device can be formed by cooling baffles or, in particular, so-called heat pipes, which are connected with the housing. In this way, the heat can be transmitted to the housing, which is preferably designed to be thermally well conductive, so as to enable the use of a large surface area for the dissipation of heat.

If at least one of the coils is equipped with at least one temperature sensor, the temperature course within the coils can be monitored. As a result, appropriate measures can be taken to prevent damage caused by an excessive heat development.

In order to avoid failures of other gadgets disposed in the surroundings of the cleaning apparatus, the housing is preferably substantially closed for shielding off the electromagnetic field generated by the coils.

A configuration in which the housing does not require forced cooling and cooling openings and is sealed to protect the interior of the housing from contaminants is advantageous, since failures frequently caused by penetrating dirt will thereby be avoided.

If the coils comprise additional magnetic baffles, the magnetic field can be intensified in a selective and focused manner, since an increase in the magnetic field will thereby be achieved in a specific region so as to enable enhanced cleaning of the welding torch. In addition, such magnetic baffles can be used to equalize the magnetic field over an enlarged area and, hence, obtain a more homogeneous field in order to achieve equally good cleaning results over the entire region.

In method terms, the object of the invention is achieved in that the first coil for generating an electromagnetic field is supplied with electrical energy after the at least one further coil. By varying the time between the energization of the at least one further and first coils, the electromagnetic field can be changed both in terms of space and in terms of time. This allows for the optimum adaptation to the geometry, and the magnetic shielding behavior caused by the gas nozzle, of the welding torch. An essential advantage also resides in that, by using at least two coils, the individual windings can be selected to be shorter. This will lead to a higher magnetic flux density and, consequently, to a higher force acting on the contaminants in the welding torch. Due to the fact that the magnetic field resulting from at least two coils will remain on a high level over a prolonged period of time, the field-shielding effect of the normally used cooper gas nozzle can be overcome more effectively so as to provide for a higher cleaning effect in the interior of the welding torch.

In a preferred manner, the first coil is supplied with electrical energy while the supply of the at least one further coil with electrical energy is being maintained.

In an advantageous manner, the first coil is supplied with electrical energy 1-3 ms, in particular 1.5 ms, after the at least one further coil. The magnetic fields generated by the coils will thus be caused to fuse to a common magnetic field so as to enlarge the cleaning area.

The present invention will be explained in more detail by way of the attached, schematic drawings. Therein:

Figure 1:
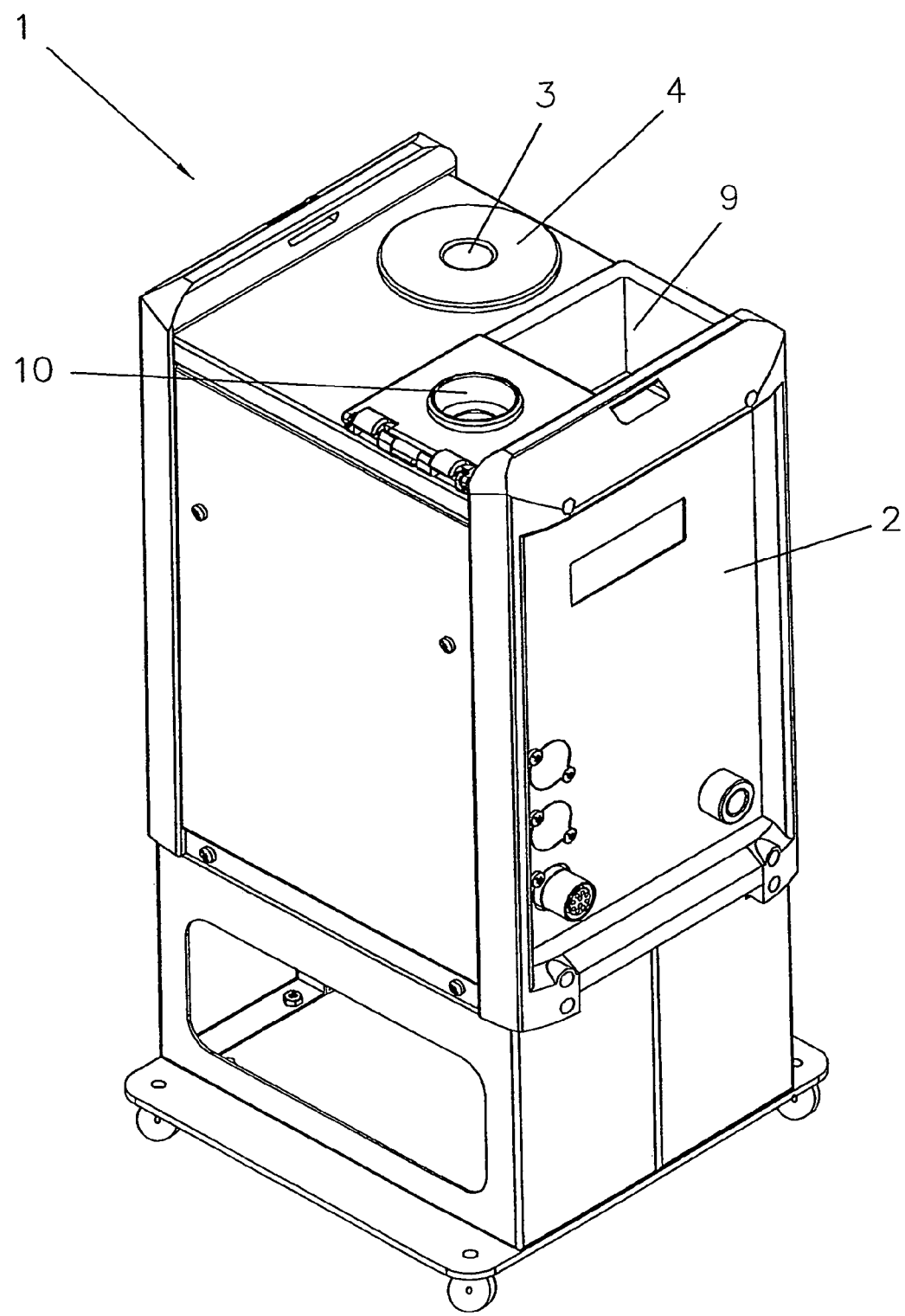
FIG. 1 is an elevational view of a cleaning apparatus in a simplified, schematic illustration.
Figure 2:
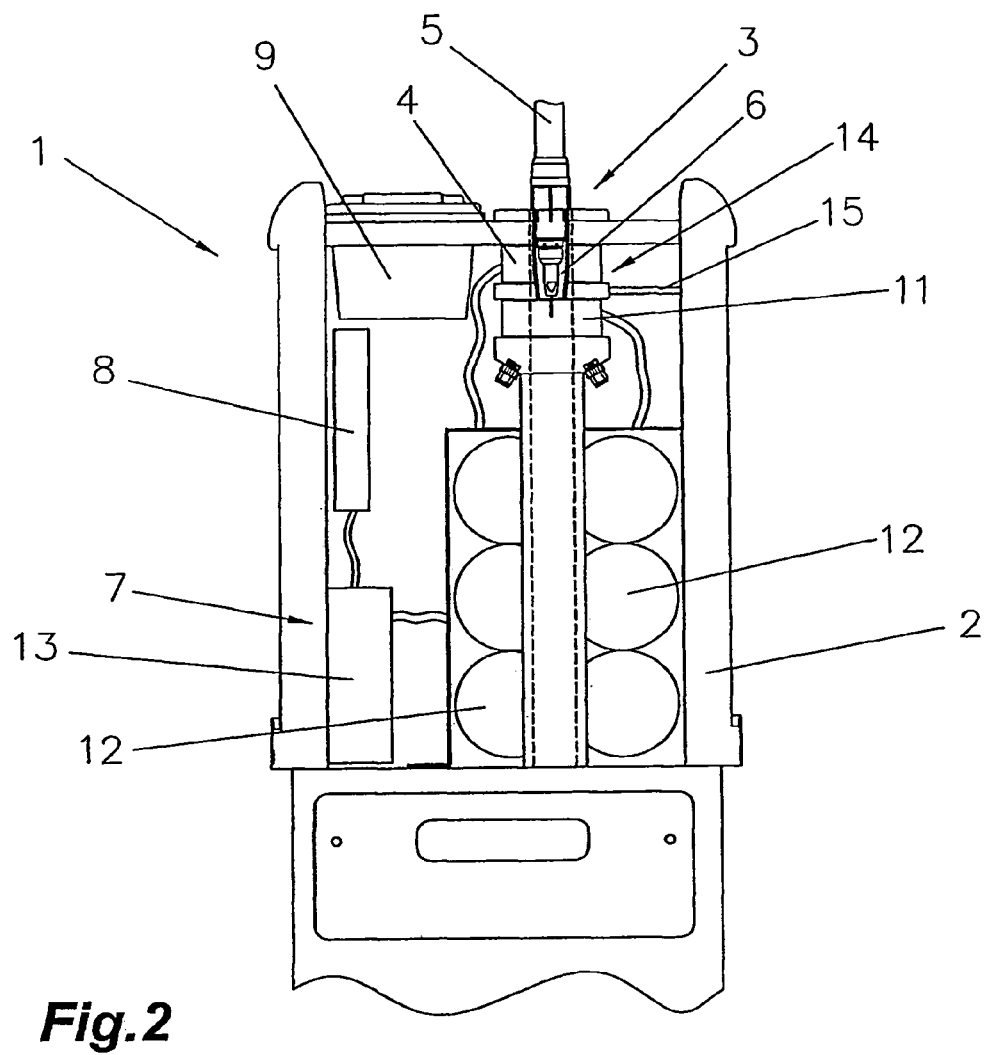
FIG. 2 is a schematic illustration of the cleaning apparatus with all its essential components in the side view.
Figure 3:
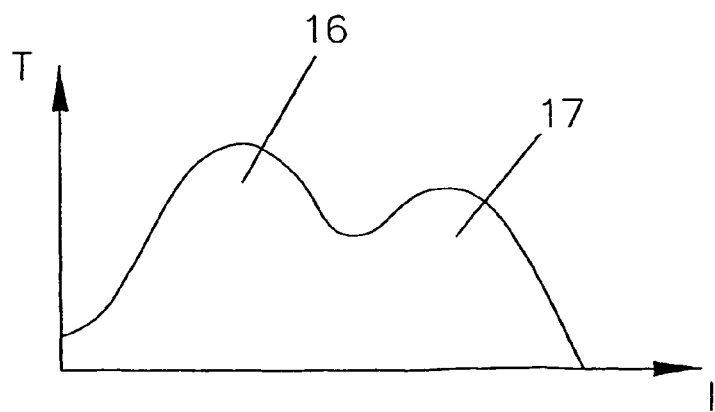
FIG. 3 is a simplified illustration of the magnetic field forming for a cleaning process.

FIGS. 1 to 3 depict a cleaning apparatus 1, which comprises a housing 2 in which all the components necessary for the cleaning apparatus 1 are arranged. In this respect, it should be mentioned that the individual components illustrated in FIG. 2 are connected with one another, wherein, to this end, only one line is indicated for the sake of clarity.

In the housing 2, an opening 3 is provided, which is associated to a coil 4 in such a manner as to enable a welding torch 5, in particular the tip or the gas nozzle 6 of the welding torch 5, to be introduced into the coil 4, whereupon electromagnetic cleaning can be performed. To the coil 4, a supply line 7 is connected, which is connected with a control device 8 for activation. It goes without saying that the supply device 7 and the control device 8 also form a common structural unit. In addition, the cleaning apparatus 1 can be equipped with a device for applying a cleaning fluid or wetting fluid. To this end, a tub 9 is provided for a cleaning fluid (not illustrated), into which the welding torch 5 can be immersed. Adjacent the tub 9, a refill container can, for instance, be located in a reception device 10 to feed the tub 9 with cleaning fluid. The refill container may, of course, also be arranged in the interior of the housing 2 with the cleaning fluid being conveyed into the tub 9 by a pump, or a connection may be provided on the housing 2 to feed the tub 9 externally with the cleaning fluid.

As is more readily apparent from FIG. 2, a further, second coil 11 is provided, which is associated with the first coil 4. The two coils 4, 11 are independently powered with electrical energy by the supply unit 7. Each of the coils 4, 11 is, for instance, dimensioned to have a diameter of 80 mm, a height of 40 mm and 120 windings of a wire having a cross section of 5 mm$^2$. The two coils 4, 11 are axially superimposed. The shape of the coils 4, 11 may be round or cylindrical or formed by an air gap. It must be ensured that the welding torch 5, in particular the gas nozzle 6, can be positioned in the center of the coils 4, 11 such that the generated magnetic field can act on the welding torch 5 when the coils 4, 11 are powered with electrical energy.

In order to supply the coils 4, 11 with energy, the two coils 4, 11 are connected with the supply device 7, wherein each of the coils 4, 11 is connected with at least one, in particular three, capacitors 12 via an interposed switching element (not illustrated). By activating the switching element, the energy charged in the capacitors 12 can thus be conducted to the coils 4, 11. In order to enable the charging of the capacitors 12, the latter are directly connected to the output of a short-circuit-resistant transformer 13 such that, when applying a voltage to the primary side of the transformer 13, said voltage is transmitted to the secondary side and subsequently directly fed into the capacitors 12 for charging the capacitors 12. Thus, the appropriate conversion of energy from the primary side to the secondary side can be effected via the transformer 13 so as to achieve the optimum charge of the capacitors 12 and, at the same time, a galvanic separation. In a preferred manner, two to five capacitors 12, in particular three capacitors 12, are used per coil 4, 11, each capacitor 12, for instance, having a capacity of 4700 µF and being dimensioned for a voltage of 500V. The two coils 4, 11 may, of course, also be dimensioned differently.

Instead of providing capacitors 12, the coils 4, 11 may also be directly supplied with electrical energy, to which end the power supply to the coils 4, 11 is provided by a clocked power supply unit and, in particular, an inverter current source.

For cleaning, the further coil 11, which is arranged opposite the opening 3, is preferably first supplied with electrical energy. The magnetic field is thus able to propagate from the further coil 11 in the direction of the opening 3, i.e. to the first coil 4. In doing so, the two coils 4, 11 can be powered differently. A ratio of 60:40, 70:30 or 30:70, 40:60 may, for instance, be chosen. In order to achieve even better cleaning, it is possible to equip the coils 4, 11 with additional magnetic baffles (not illustrated) in order to amplify the magnetic field in a selective and focused manner and to equalize the magnetic field over an enlarged region so as to obtain a more homogeneous field.

It is, furthermore, advantageous to arrange a cooling device 14 for the coils 4, 11 in the housing 2, since heat will accumulate between the two coils 4, 11 during the power feed, which has to be dissipated in order to avoid damage to the coils 4, 11. The cooling device 14 in its simplest form can be formed by suitable cooling baffles 15 such that the heat between the coils 4, 11 will be taken up by the cooling baffles 15 and carried away from the heat source. The cooling baffles 15 are preferably connected with the housing 2 so as to enable the heat to be dissipated to the housing 2, as is schematically illustrated in FIG. 2. The cooling device 14 can also be directly integrated in one or both of the coils 4, 11. The dissipation of heat to the exterior is important because, due to the large electromagnetic fields, the housing 2 is closed toward the exterior for shielding purposes, and dirt cannot enter the interior of the housing 2, either. Due to the efficient dissipation of heat via the housing, the use of fans or the like, which would require slits in the housing 2, is not necessary. The housing 2 can thus do without forced cooling and cooling openings and is thus externally protected against contamination. The use of so-called heat pipes as cooling means 14 would also be possible, which heat pipes could be inserted between the coils 4, 11 or wound along with the coils 4, 11. The free ends of the heat pipes would be connected with the housing 2 in a manner that the heat would be conducted to the housing 2 via the heat pipes. Moreover, the cooling device 14 for the coils 4, 11 may also be comprised of a compressed-air system, with a compressed-air connection being required on the housing 2. Yet, the coils 4, 11 can also be cooled by a liquid or gaseous medium.

At least one of the coils 4, 11 may be equipped with at least one temperature sensor to regulate the discharge efficiency. The temperature development can be monitored by the at least one temperature sensor, and the temperature development can, for instance, be influenced via the supplied power or energy. At too high a temperature, the coils 4, 11 may, for instance, be supplied with less power during the subsequent cleaning procedure, so that a reduced temperature development will occur. It is further possible to use the temperature sensors also for cooling, to which end active cooling, i.e. a controllable cooling device 14 as is, for instance, used with compressed-air cooling will be applied. The efficiency of the cooling device 14 can thus be increased or reduced as a function of the temperature development such that the optimum temperature will always be ensured. This means that the cooling device is controlled or turned on and off and cooling will only be applied where actually required.

It is essential that, when using two coils 4, 11, the activation of the coils 4, 11 be accordingly controlled by the control device 8. In a preferred manner, the supply of the two coils 4, 11 for cleaning the welding torch 5 is effected consecutively, which means that, after having supplied the further coil 11 with energy for generating a magnetic field 17, the first coil 4 is supplied with energy at a pregiven time for generating a magnetic field 16, with the further coil 11 yet being continued to be energized even after the activation of the first coil 4. It is thus ensured that the two magnetic fields 16, 17 of the two coils 4, 11 will fuse together to form a common magnetic field. This is schematically illustrated in FIG. 3, the magnetic field being plotted on the ordinate T and the length or path axially along the coils 4, 11 being plotted on the abscissa I. The first coil 4 is preferably energized 1 ms to 3 ms, particularly 1.5 ms, after the supply of the further coil 11 with energy.

As a rule, the magnetic fields 16, 17 will only form in specific regions of the coils 4, 11 such that, when using but one coil 4 as is known from the prior art, a strong magnetic field will only occur in that region and good cleaning results will only be achieved in that region. In order to achieve good cleaning results with the cleaning apparatus known from the prior art, the welding torch 5 would have to be inserted differently deeply into the coil 4 so as to obtain a good cleaning effect over the entire gas nozzle 6.

Since two coils 4, 11 are now used, two different regions or magnetic fields 16, 17 will now form, which, however, will fuse together to a common magnetic field because of the slight distance and because of the temporally concerted energization. The cleaning area can thus be substantially enlarged, since the magnetic field is acting over a larger area. The welding torch 5 and, in particular, the gas nozzle 6 can thus be completely cleaned at a cleaning process and need no longer be positioned differently deeply in the coil 4, as is known from the prior art.

The coils 4, 11 may, furthermore, be extended by additional windings via appropriate switching elements so as to enable the respective switching elements to be activated by the control device 8, if necessary, in order to increase the number of windings of the coils 4, 11, or reduce the number of windings of the coils 4, 11 by accordingly deactivating the switching elements. An adaptation of the magnetic field to different welding torches 5 can thus be effected, or the formation of the magnetic field can thus be influenced.

The invention claimed is:

1. A cleaning apparatus for cleaning a welding torch, including at least two cooperating coils and an opening for introducing the welding torch for the electromagnetic cleaning thereof, a control device, a supply device connected with the coils, a device for applying a cleaning fluid to the tip of the welding torch, wherein all components are arranged in a common housing, wherein, for the cleaning of the welding torch, the coils are suppliable with electrical energy by the supply device independently of one another, wherein a cooling device is provided for cooling the coils, and wherein the control device is configured such that a first start timing of supplying a first coil of the at least two coils for generating an electromagnetic field with electrical energy is delayed until after a second start timing of supplying a second coil of the at least two coils with electrical energy.

2. The cleaning apparatus according to claim 1, wherein at least one capacitor is directly connected to an output of a short-circuit-resistant transformer.

3. The cleaning apparatus according to claim 1, wherein the cooling device is arranged between the coils.

4. The cleaning apparatus according to claim 1, wherein the cooling device is integrated in at least one of the coils.

5. The cleaning apparatus according to claim 1, wherein the cooling device is formed by cooling baffles or heat pipes, which are connected with the housing.

6. The cleaning apparatus according to claim 1, wherein at least one of the coils is equipped with at least one temperature sensor.

7. The cleaning apparatus according to claim 1, wherein the housing is substantially closed for shielding off the electromagnetic fields generated by the coils.

8. The cleaning apparatus according to claim 1, wherein the housing does not require forced cooling and cooling openings and is sealed to protect the interior of the housing from contaminants.

9. The cleaning apparatus according to claim 1, wherein the coils comprise additional magnetic baffles for the selective concentration, intensification and, homogenization of the magnetic field.

10. A method for cleaning a welding torch using the cleaning apparatus of claim 1, in which a tip of the welding torch is exposed to an electromagnetic field generated by at least first and second cooperating coils for the contactless removal of contaminants, wherein a cleaning fluid is applied to the tip of the welding torch prior to cleaning, wherein the first coil is supplied with electrical energy after the second coil and wherein the first and second coils are cooled so that heat forming during cleaning by the electromagnetic field can be carried off the first and second coils so as to enable an extended cleaning operation.

11. The method for cleaning according to claim 10, wherein the first coil is supplied with electrical energy while the supply of the second coil with electrical energy is being maintained.

12. The method for cleaning according to claim 10, wherein the first coil is supplied with electrical energy 1-3 ms after the second coil.

* * * * *